United States Patent
Okajima

(10) Patent No.: US 7,327,477 B2
(45) Date of Patent: Feb. 5, 2008

(54) IMAGE FORMING APPARATUS AND IMAGE FORMING METHOD

(75) Inventor: Aiko Okajima, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 954 days.

(21) Appl. No.: 10/601,584

(22) Filed: Jun. 24, 2003

(65) Prior Publication Data

US 2004/0008376 A1   Jan. 15, 2004

(30) Foreign Application Priority Data

Jun. 24, 2002   (JP)   ............... 2002-183409

(51) Int. Cl.
  *G06F 15/00*   (2006.01)
  *G06K 1/00*   (2006.01)
(52) U.S. Cl. ............... 358/1.1; 358/1.15; 358/1.14; 358/1.13; 347/19
(58) Field of Classification Search ............... 358/1.15, 358/1.13, 1.14, 1.1; 347/19
See application file for complete search history.

(56) References Cited

U.S. PATENT DOCUMENTS 6,894,793 B1 *   5/2005   Roosen et al. ............. 358/1.15
2002/0180822 A1 *   12/2002   Aritomi ............... 347/19

FOREIGN PATENT DOCUMENTS

JP   2002-19243 A   1/2002

OTHER PUBLICATIONS

U.S. Appl. No. 10/026,429, filed Dec. 27, 2001, Okajima.
U.S. Appl. No. 10/026,721, filed Dec. 27, 2001, Okajima.

* cited by examiner

*Primary Examiner*—Douglas Q. Tran
*Assistant Examiner*—Satwant Singh
(74) *Attorney, Agent, or Firm*—Foley & Lardner LLP

(57) ABSTRACT

A printer has a receiving section which receives print jobs, a storing section which stores the received print jobs, a display section which displays a list of the print jobs, that include special printing, an input section which forms a touch-panel-type operation panel together with the display section, and a control section. One print job is selected, by the input section, from the list displayed by the display section, and an input of changing printing conditions concerning special printing included in the selected print job is received by the input section.

8 Claims, 6 Drawing Sheets

Printing on tab paper is included.
Do you change printing conditions ?

[21] Change

[22] Not change

FIG. 6

Tab width ?

[    mm    ]

[25] OK

[26] Cancel

| 1 | 2 | 3 |
|---|---|---|
| 4 | 5 | 6 |
| 7 | 8 | 9 |
|   | 0 |   |

IMAGE FORMING APPARATUS AND IMAGE FORMING METHOD

CROSS-REFERENCE TO RELATED APPLICATIONS

This application is based upon and claims the benefit of priority from prior Japanese Patent Application No. 2002-183409, filed Jun. 24, 2002.

BACKGROUND OF THE INVENTION

1. Field of the Invention

This invention relates to an image forming apparatus and an image forming method, which can form images on special paper other than plain paper.

2. Description of the Related Art

Recently, image forming apparatuses, which can form images on special paper such as tab paper, other than plain paper, have come into wide use. In apparatuses of this kind, an image is shifted in conformity with a position and width of a tab, and the image is formed on the tab paper.

As an image forming apparatus of this kind, known is an apparatus disclosed in Jpn. Pat. Appln. KOKAI Publication No. 2002-19243, for example. The apparatus disclosed in the publication can set in advance the tab division number, an image shift amount, and page into which tab paper is inserted, etc. with an operation panel. Further, the apparatus has a function of test-copying one of a plurality of copies by a test copy key.

However, when an image is formed on tab paper, it is difficult to set the image shift amount. For example, processing of margins varies according to the application soft used. Further, the conveying position of tab paper is dislocated according to the position of the cassette which feeds the tab paper, thus it is difficult to properly set the image shift amount.

The image shift amount to tab paper can be adjusted by actually test-copying one copy and checking whether the image is dislocated or not, as in the apparatus disclosed in the above publication. However, this method has a problem that all the paper of the copy including the test-copied tab paper is wasted if the test-copied image is dislocated from the tab paper.

BRIEF SUMMARY OF THE INVENTION

This invention has been made in view of the above points. The object of the invention is to provide an image forming apparatus and an image forming method, which can form images on special paper without fail and efficiently.

To achieve the above object, an image forming apparatus according to an embodiment of the present invention extracts an print job from a storing section, and receives an input of changing printing conditions concerning special printing included in the print job. Its print section executes a print job extracted the storing section without no change, and also executes the print job including special printing whose printing conditions has been changed through an input section. Further, the apparatus prints, as a test, at least one page of the special printing included in the print job to be executed in the print section, with its test print key.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a diagram showing an example of a picture displayed in the processing of step 8 in FIG. 4.

FIG. 7 is a diagram showing an example of a picture displayed in the processing of step 9 in FIG. 4.

DETAILED DESCRIPTION

An embodiment of the present invention will now be described in detail with reference to the drawings.

Figure 1:
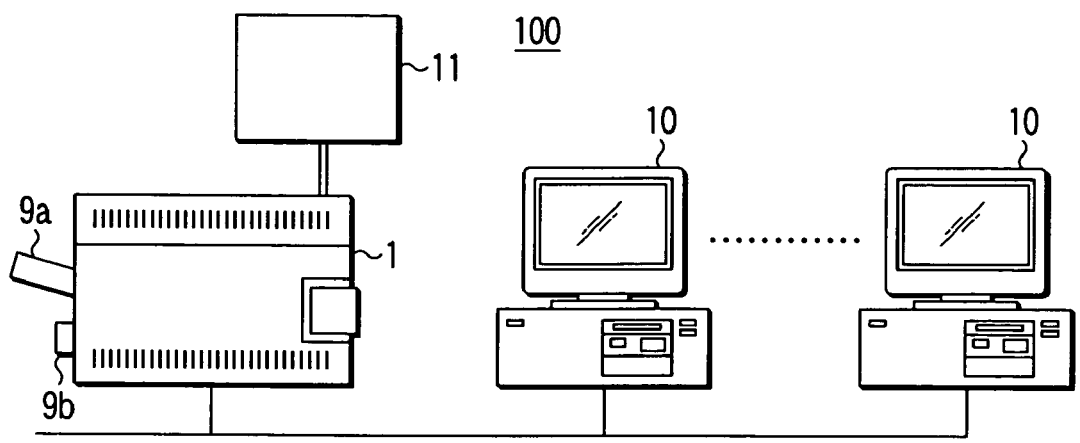
FIG. 1 is a schematic diagram showing a state where a printer according to an embodiment of the present invention is networked with a plurality of personal computers.

FIG. 1 shows a printing system 100 in which a printer 1 (image forming apparatus) according to an embodiment of the present invention is networked with a plurality of personal computers 10.

Users operate the respective personal computers 10, input data such as an image and characters necessary for printing, and transmit a command for executing printing based on the input data, as a print job. The printer 1 receives and stores print jobs transmitted from the personal computers 10, and executes the print jobs in order of reception basically.

Figure 2:
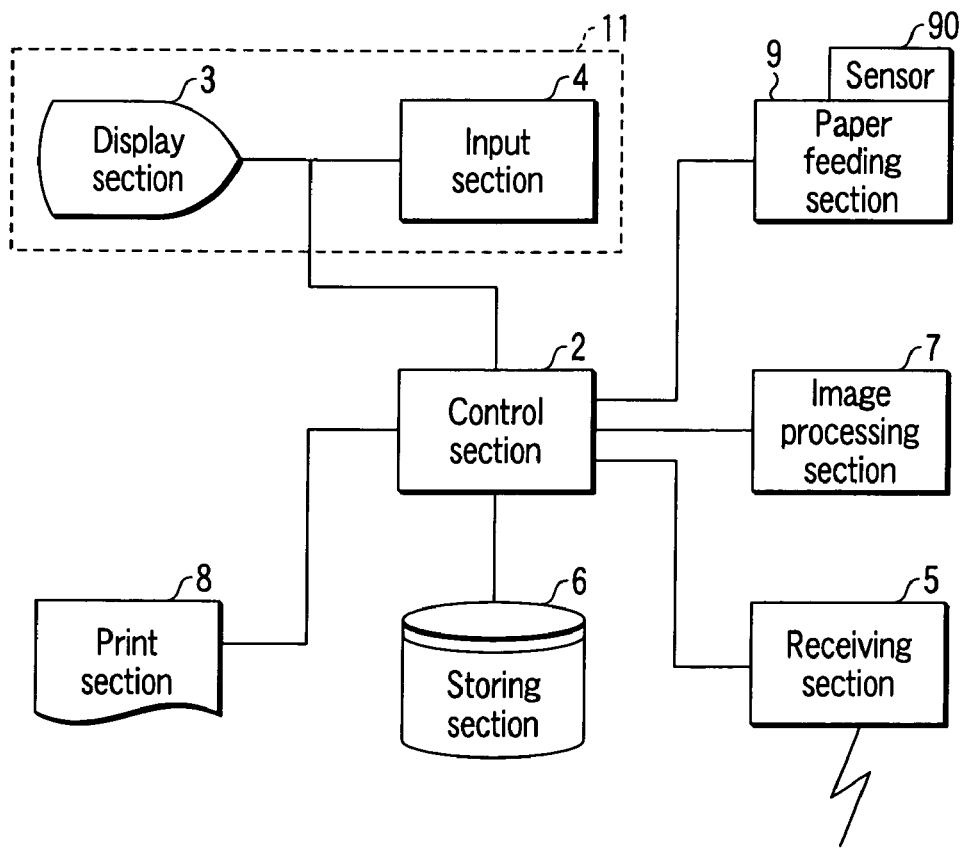
FIG. 2 is a block diagram showing a structure of the printer of FIG. 1.

FIG. 2 is a block diagram showing constituent elements of the printer 1.

The printer 1 has a control section 2. The control section 2 has a touch-panel-type operation panel 11 having a function as a display section 3 and a function as an input section 4, a receiving section 5 which receives print jobs transmitted from the personal computers 10, a storing section 6 which stores received print jobs, an image processing section 7 which processes page data included in the print jobs according to necessity, a print section 8 which executes the print jobs, and a paper feeding section 9 which feeds paper to the print section 8.

The paper feeding section 9 has two paper-feeding cassettes 9a and 9b (please refer to FIG. 1), a manual tray (not shown), and a sensor 90 which senses presence/absence of paper in each paper-feeding tray and the manual tray. In addition to plain paper, special paper such as tab paper can be set in the paper-feeding cassettes 9a and 9b and the manual tray. The term "tab paper" indicates paper in which a unitary tab projects from one side of rectangular paper.

Special paper includes cardboard and foreign (U.S. Chinese, etc.) paper, besides tab paper.

The control section 2 also functions as a judging section of the present invention, and judges whether a print job received by the receiving section 5 includes printing on special paper such as tab paper (this print is referred to as "special printing" hereinafter). The term "special printing" here means special printing which easily causes jam in comparison with printing on plain paper.

The storing section 6 stores all the print jobs received from the personal computers 10 by the receiving section 5. In particular, it stores specific print jobs, which have been judged by the control section 2 as including special printing, in distinction from print jobs not including special printing.

The display section 3 displays a table (list) of the specific print jobs which have been judged as including special printing by the control section 2, among the print jobs stored in the storing section 6. As a method of displaying the list, there is a method of displaying user names of the personal computers 10, besides a method of displaying names of the print jobs. Further, the display section 3 switches a plurality of input pictures described below for receiving inputs of changing printing conditions for special paper.

The input section 4 receives various operation inputs by users. A user, for example, selects a print job to be executed from the list displayed by the display section 3, and inputs it by the input section 4. In this embodiment, since the display section 3 and the input section 4 are formed as the touch-panel-type operation panel 11, the user can perform an input operation by touching an item displayed on the display section 3.

The image processing section 7 shifts page data to be printed by the width of the tab, at the time of printing on tab paper, for example. Another way may be adopted in which the paper feeding section 9 shifts feeding timing of tab paper by the width of the tab.

The print section 8 prints images and characters in the page data included in a print job read from the storing section 6, on paper (including tab paper) fed from the paper feeding section 9. Further, the print section 8 executes a print job including the special printing whose printing conditions have been changed through the input section 4. The printing section 8 also selectively prints only special printing included in a print job by a "test print" button 31 described below.

Next, operations of the above printer 1 will now be described, with reference to examples of pictures of the operation panel 11 shown in FIGS. 6-9, together with flow chart shown in FIGS. 3-5.

Figure 3:
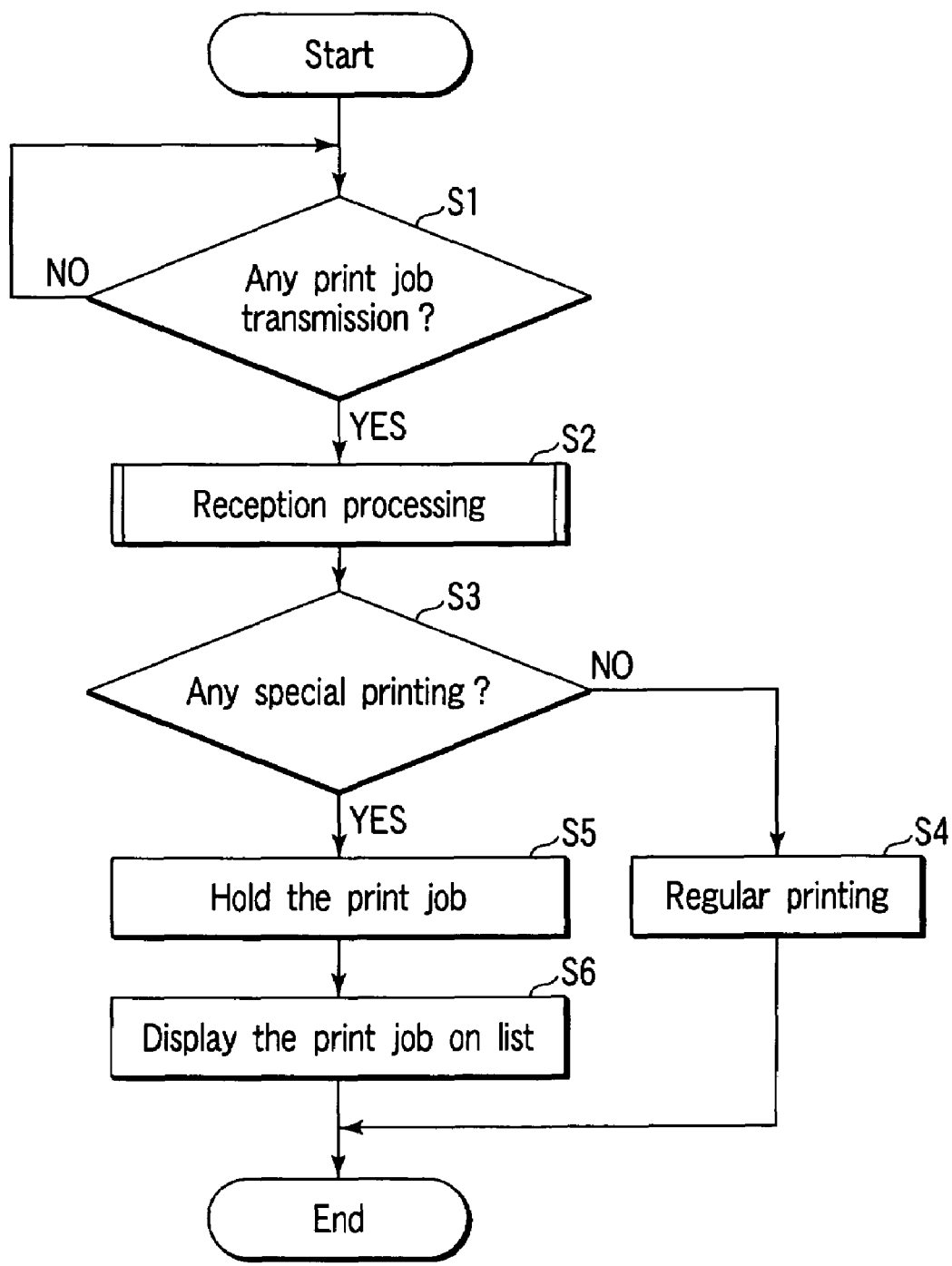
FIG. 3 is a flow chart for explaining operations by the printer of FIG. 2.

Firstly, as shown in FIG. 3, when a print job is transmitted from one of the personal computers 10 through the network (Step 1: YES), the printer 1 receives the print job by the receiving section 5 (Step 2). The received print job is stored in the storing section 6.

Figure 5:
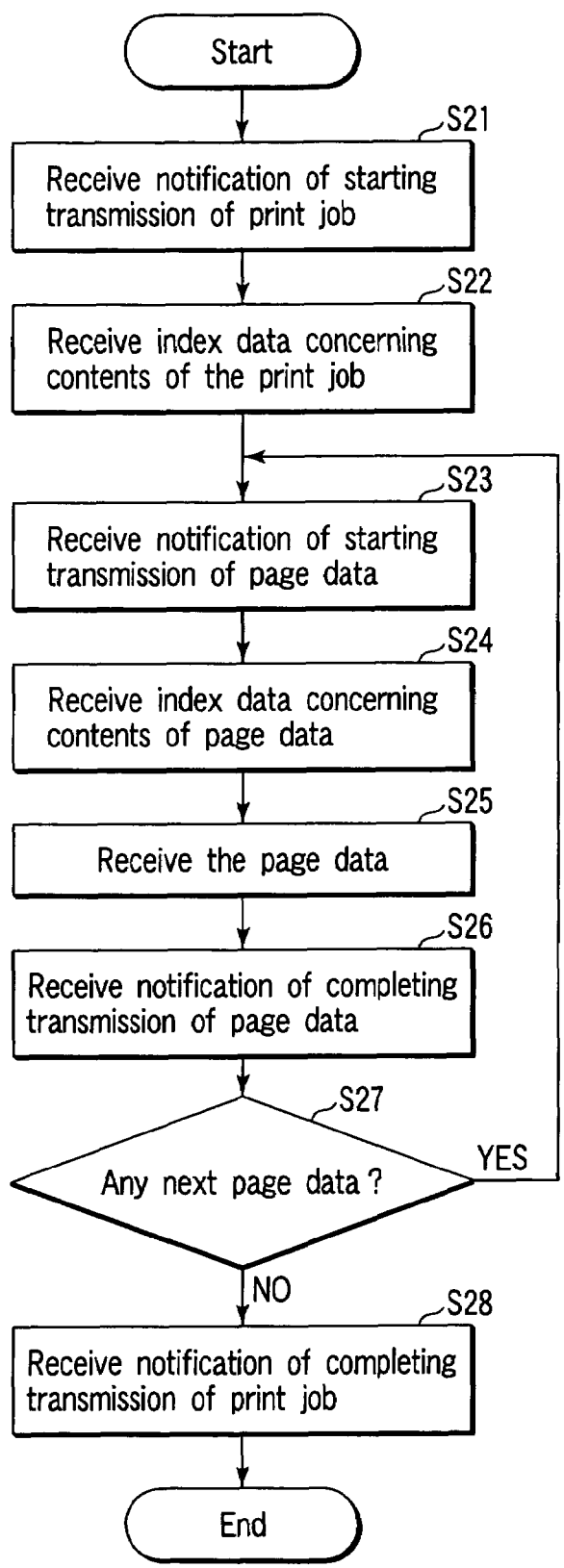
FIG. 5 is a flow chart for explaining steps of the reception processing in FIG. 3.

In the receiving process of Step 2, as shown in FIG. 5, first the printer 1 receives a notification of starting transmission of the print job, which is transmitted from the personal computer 10 being the transmitter of the print job (Step 21). Thereafter, the printer 1 receives index data indicating contents of the print job (referred to as "job index" hereinafter) (Step 22). Then, the printer 1 receives a notification of starting transmission of page data of a first page included in the print job (Step 23). Next, the printer 1 receives index data indicating contents of the page data (hereinafter referred to as "page index") (Step 24), and then receives the page data (Step 25). Thereafter, the printer 1 receives a notification of completing transmission of the page data (Step 26). Further, if the print job has page data for a second page and following pages (Step 27: YES), the printer 1 repeats Steps 23-26 the same times as the number of the remaining pages to receive the page data for the second page and following pages. If it is determined in Step 27 that there is no next page data (Step 27: NO), the printer 1 receives a notification of completing transmission of the print job, and ends its operation (Step 28).

Further, at the time of the receiving process of Step 2 (that is, Steps 21-28), the control section 2 judges whether the received print job includes special printing or not (Step 3). If it is judged in Step 3 that the print job does not include any special printing (Step 3: NO), the print job is read from the storing section 6 and executed immediately in the print section 8, and normal printing is performed (Step 4).

In the meantime, if it is determined in Step 3 that the print job includes special printing (Step 3: YES), the print job is not executed but maintained in the storing section 6 (Step 5). Specifically, print jobs including special printing are stored in the storing section 6 without being executed.

Further, a list of the print jobs including special printing, which are stored in the storing section 6, is displayed by the display section 3 (Step 6). In the state where the print jobs including special printing are displayed as a list by the display section 3 as described above, the printer 1 waits for the user's instructions to execute the print jobs.

Figure 4:
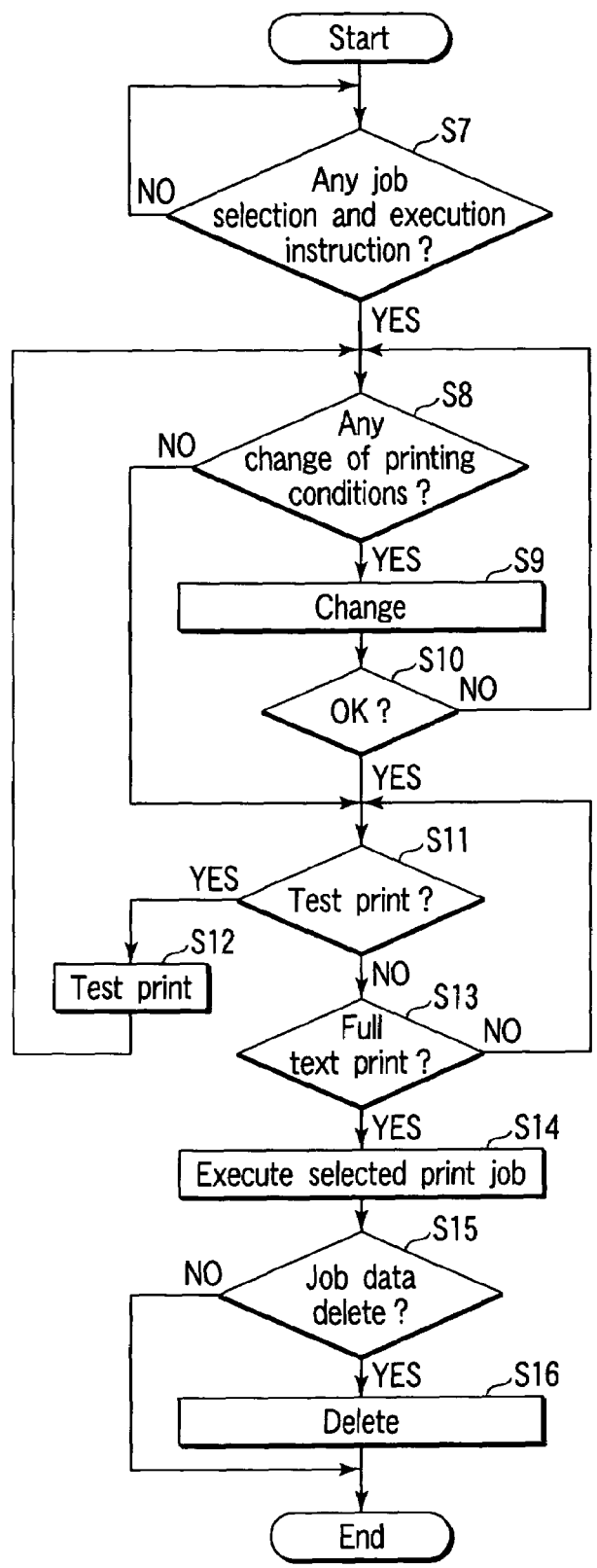
FIG. 4 is a flow chart for explaining operations by the printer of FIG. 2.

In this state, as shown in FIG. 4, when the user inputs an instruction to execute one of the listed print jobs (that is, touching the item of the print job selected) (Step 7: YES), the display section 3 switches the displayed picture to the picture shown in FIG. 6. Suppose that the print job selected in Step 7 includes, as special printing, printing on tab paper.

Figure 8:
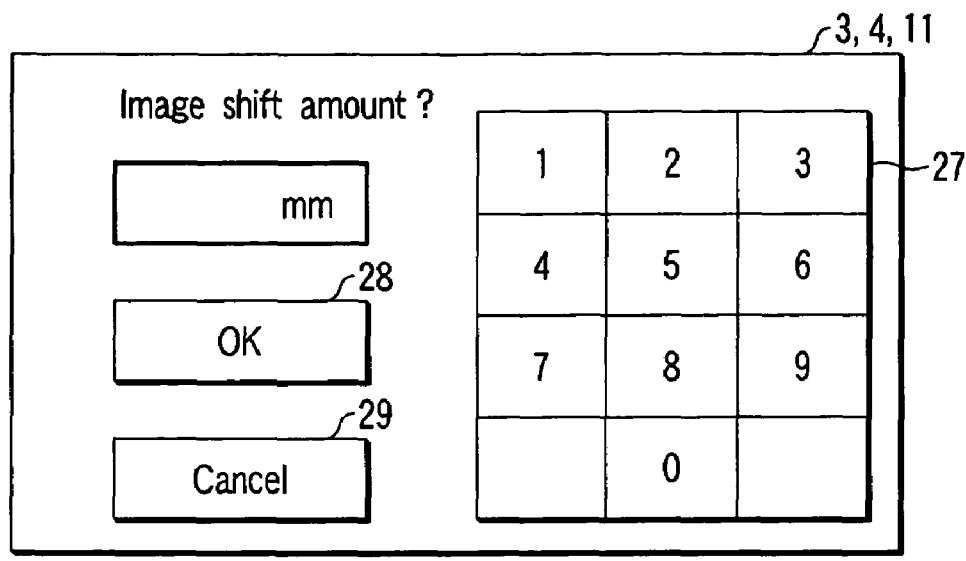
FIG. 8 is an example of a picture displayed in the processing of step 9 in FIG. 4.

In this state, when a "change" button 21 is touched (Step 8: YES), the display section 3 successively displays the pictures shown in FIGS. 7 and 8, and the user inputs changes in the printing conditions by the input section 4 (Step 9). Specifically, when the picture of FIG. 7 is displayed, the width of the tab is inputted by a numeric keypad 24, and the set value is fixed by pressing an "OK" button 25 (Step 10: YES). Further, when the picture of FIG. 8 is displayed, an image shift amount is inputted by a numeric keypad 27, and the set value is fixed by pressing an "OK" button 28 (Step 10: YES). In the meantime, if a "cancel" button 26 or 29 is touched in the picture of FIG. 7 or 8 on display (Step 10: NO), the process returns to Step 8 and the picture of FIG. 6 is displayed again.

In the meantime, if a "Not change" button 22 is touched in the state where the picture of FIG. 6 is on display (Step 8: NO) or an "OK" button 28 is touched in the state where the picture of FIG. 8 is on display (Step 10: YES), the picture shown in FIG. 9 is displayed by the display section 3 in place of the displayed picture.

In this state, if the user touches a "test print" button 31 (test print key) (Step 11: YES), test print on a first sheet of tab paper is performed, on the basis of the tab width and the image shift amount inputted in Step 9 (Step 12). The number of sheets of tab paper to be test-printed can be set to any number, and different numbers are preset according to the type of the printer. In this embodiment, the printer 1 is set such that test print on only the first sheet of tab paper is automatically performed when the "test print" button 31 is touched.

After test print has been performed in Step 12, the picture of FIG. 6 is displayed again, such that the user can reset the printing conditions after checking the printed tab paper.

Figure 9:
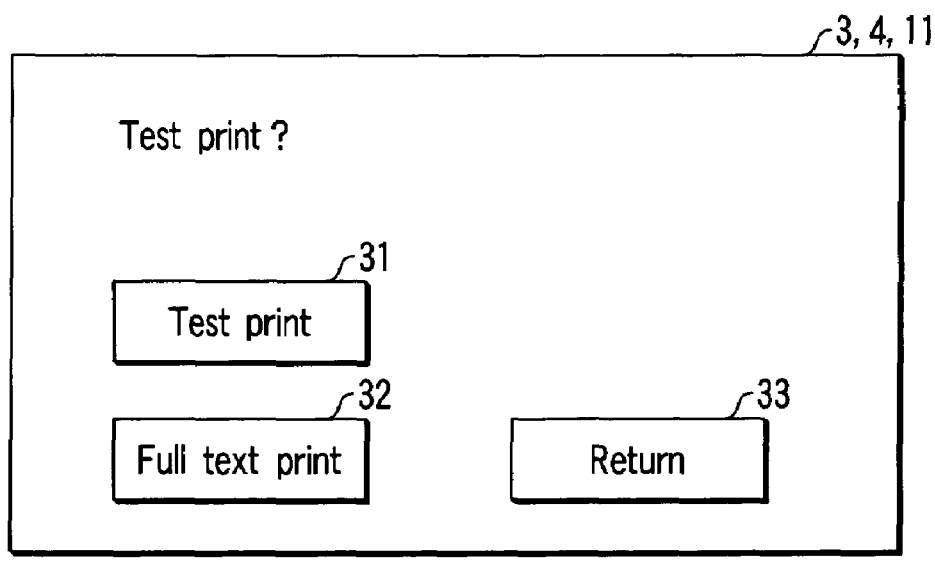
FIG. 9 is an example of a picture displayed in the processing of step 11 in FIG. 4.

In the meantime, in the state where the picture of FIG. 9 is on display, when a "full text print" button 32 is touched instead of the "test print" button 31 (Step 11: NO, Step 13: YES), the print job selected to be executed in Step 7 and including the change inputted in Step 9 is executed, and printing to all the paper including tab paper is performed (Step 14).

Thereafter, the display section 3 displays a picture (not shown) for user's determining whether job data concerning the print job executed in Step 14 is to be deleted or not, and the job data is selectively deleted (Steps 15, 16).

Further, if a "return" button 33 is touched in the state where the picture of FIG. 9 is on display in Step 11, the picture of FIG. 7 is displayed and the printing conditions can be reset.

As described above, according to the embodiment, when the printer 1 has received a print job including printing on special paper such as tab paper, the printer 1 does not execute the print job immediately, but stores it in the storing section 6 and displays it by the display section 3. Further, when the user has inputted an instruction to execute the print job by the input section 4, the printer reads the print job from the storing section 6 and executes it by the print section 8.

Therefore, if special paper, such as tab paper, to be used for the print job is not ready or a jam has occurred at the time of printing on special paper, the user stands by the printer 1, and thus can cope with it immediately. Therefore, the waiting time of the following print jobs due to unnoticed paper out or jam can be greatly reduced, and this can increase the operation rate of the printer.

Further, since the printer 1 is configured to store print jobs including special printing in the storing section 6 and to display a list of the print jobs, the user goes to the printer and can make the desired print job executed at an appropriate timing, thus convenience is improved. Furthermore, when the print job is executed, the user can test special printing on tab paper, and adjust the print position on the tab by viewing the test-printed tab paper.

More specifically, in this embodiment, when an instruction to execute a print job has been inputted by the input section 4, change of the printing conditions concerning special printing included in the print job can be inputted. Further, after the printing conditions concerning the special printing has been changed, test printing on special paper can be performed. In particular, in test printing, printing is performed only on special paper.

Therefore, the user can change the printing conditions as to tab paper when executing a print job by operating the printer 1. Further, after at least one page of special printing on tab paper has been test-printed, the user can check the actual print of the tab paper and change the printing conditions again. The user does not need to test-print all the pages as in the above conventional apparatus, and can securely and efficiently perform printing on tab paper.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, although printing on tab paper was explained in the above embodiment, the present invention is not limited to it, but can be applied to printing on special paper such as cardboard and foreign paper.

Further, although in the above embodiment only printing on a first sheet of tab paper is performed when the "test print" button 31 has been touched, printing on all sheets of tab paper included in the print job may be performed. The number of sheets to be test-printed may be set in advance in the printer used, or the apparatus may be configured to determine the number of sheets to be test-printed according to the number of times of touching the "test print" button 31. In this case, a timeout between button touching is set, and the number of successive touching of the button, with no timeout intervened between the touching, is counted as the number of sheets to be test-printed.

Furthermore, a plurality of "test print" buttons may be provided on the picture of FIG. 9 such that the number of sheets to be test-printed can be changed by touching the different buttons. As another way, the apparatus may be configured such that, after the "test print" button 31 on the picture of FIG. 9 has been touched, the picture is switched to a picture which can input the number of sheets to be test-printed.

What is claimed is:

1. An image forming apparatus comprising:
   a storing section which stores print jobs;
   a print section which executed one print job extracted from the storing section;
   a test print key to print, as a test, at least one page of special printing included in the print job to be executed in the print section;
   wherein the special printing is printing carried out on a special sheet other than a regular sheet; and
   when the test print key is entered, the special printing is carried out on the special sheet as a test.

2. An image forming apparatus according to claim 1, further comprising an input section which receives an input of a change in printing conditions concerning the special printing.

3. An image forming apparatus according to claim 2, wherein the special sheet is a tab sheet, and wherein a user enters in a width of tab and an amount of displacement of image by way of the input section.

4. An image forming apparatus according to claim 3, further comprising means for adjusting a printing position with respect to the tab while the special printing is carried out on the special sheet.

5. An image forming apparatus according to claim 1, the print section holding a print job to be executed in the print section in waiting, if the print job includes special printing.

6. An image forming apparatus comprising:
   a receiving section which receives print jobs;
   a storing section which stores the received print jobs;
   a print section which executes one print job extracted from the storing section;
   a judging section which judges whether each of the print jobs received by the receiving section includes special printing on a special sheet other than a regular sheet or not;
   a display section which displays a list of the print jobs judged as including special printing by the judging section;
   an input section which receives selection of one print job from the print jobs on the displayed list by a user, and receives an input of changing printing conditions concerning the special printing included in the selected print job;
   a test print key to print, as a test, at least one page of the special printing included in the print job to be executed in the print section on the special sheet; and
   a control section which extracts, from the storing section, the print job that is selected by the user by the input section, and makes the print job executed by the print section with no change, and also makes the print job including the special printing, whose printing conditions have been changed through the input section, executed by the print section.

7. An image forming apparatus according to claim 6, the control section extracting the print job, which do not include special printing, from the storing section and making the print job executed by the print section.

8. An image forming method comprising:

extracting a print job including special printing from a storing section;

receiving an input of changing printing conditions concerning the special printing included in the extracted print job;

printing, as a test, at least one page of the special printing whose printing conditions has been changed on a special sheet; and executing the print job including the test-printed special printing.

* * * * *